(12) United States Patent
Zhang et al.

(10) Patent No.: US 12,473,467 B2
(45) Date of Patent: Nov. 18, 2025

(54) POLYURETHANE-BASED UV-CURABLE COMPOSITION, ADHESIVE FILM COMPRISING THE SAME, ADHESIVE TAPE AND BONDED MEMBER

(71) Applicant: 3M INNOVATIVE PROPERTIES COMPANY, St. Paul, MN (US)

(72) Inventors: Lijing Zhang, Shanghai (CN); Fan Gao, Shanghai (CN); Guoliang Zhang, Shanghai (CN)

(73) Assignee: 3M Innovative Properties Company, St. Paul, MN (US)

( * ) Notice: Subject to any disclaimer, the term of this patent is extended or adjusted under 35 U.S.C. 154(b) by 694 days.

(21) Appl. No.: 17/757,639

(22) PCT Filed: Jan. 4, 2021

(86) PCT No.: PCT/IB2021/050024
§ 371 (c)(1),
(2) Date: Jun. 17, 2022

(87) PCT Pub. No.: WO2021/140432
PCT Pub. Date: Jul. 15, 2021

(65) Prior Publication Data
US 2023/0034083 A1    Feb. 2, 2023

(30) Foreign Application Priority Data
Jan. 7, 2020   (CN) .......................... 202010016476.X (51) Int. Cl.
| | |
|---|---|
| *C09J 7/40* | (2018.01) |
| *C08L 75/08* | (2006.01) |
| *C09J 7/10* | (2018.01) |
| *C09J 7/38* | (2018.01) |
| *C09J 11/08* | (2006.01) |
| *C09J 175/08* | (2006.01) |

(52) U.S. Cl.
CPC .............. *C09J 7/403* (2018.01); *C08L 75/08* (2013.01); *C09J 7/10* (2018.01); *C09J 7/38* (2018.01); *C09J 11/08* (2013.01); *C09J 175/08* (2013.01); *C09J 2467/005* (2013.01)

(58) Field of Classification Search
None
See application file for complete search history.

(56) References Cited

U.S. PATENT DOCUMENTS

| | | | |
|---|---|---|---|
| 4,753,826 A * | 6/1988 | Lauman | C09D 175/00 523/466 |
| 6,254,954 B1 | 7/2001 | Bennett et al. | |
| 6,274,643 B1 | 8/2001 | Karim et al. | |
| 8,536,242 B2 | 9/2013 | Fukui et al. | |
| 2006/0052475 A1 | 3/2006 | Husemann et al. | |
| 2014/0045965 A1 | 2/2014 | Noguchi et al. | |
| 2014/0329926 A1 | 11/2014 | Kirino | |
| 2020/0248050 A1 * | 8/2020 | Nakajima | C08L 63/00 |
| 2020/0325252 A1 * | 10/2020 | Kawashima | C08G 75/26 |
| 2021/0363276 A1 | 11/2021 | Zhang et al. | |

FOREIGN PATENT DOCUMENTS

| | | | | |
|---|---|---|---|---|
| CN | 1281577 | C | 10/2006 | |
| CN | 102279524 | A | 12/2011 | |
| CN | 102952503 | B | 11/2015 | |
| CN | 110643286 | A * | 1/2020 | C08F 2/50 |
| CN | 112322237 | A * | 2/2021 | |
| CN | 110643286 | B | 11/2021 | |
| DE | 102017126328 | A1 * | 5/2018 | B32B 37/12 |
| JP | 2007077382 | A * | 3/2007 | |
| JP | 4973868 | B2 * | 7/2012 | |
| JP | 2018170208 | A | 11/2018 | |
| WO | 2003033500 | A1 | 4/2003 | |
| WO | WO-2008001637 | A1 * | 1/2008 | C07C 243/26 |
| WO | 2012003108 | A1 | 1/2012 | |
| WO | 2012003152 | A1 | 1/2012 | |
| WO | 2012003153 | A1 | 1/2012 | |
| WO | 2012003160 | A1 | 1/2012 | |
| WO | 2013089100 | A1 | 6/2013 | |
| WO | 2013101742 | A1 | 7/2013 | |
| WO | 2013130238 | A1 | 9/2013 | |
| WO | 2013151739 | A1 | 10/2013 | |
| WO | 2015083331 | A1 | 6/2015 | |

(Continued)

OTHER PUBLICATIONS

Debuissy et al. Synthesis of potentially biobased copolyesters based on adipic acid and butanediols: Kinetic study between 1,4- and 2,3-butanediol and their influence on crystallization and thermal properties. Polymer, vol. 99, Sep. 2, 2016, pp. 204-213. (Year: 2016).*
Blickenstorfer, "Adhesive Curing on Demand", Nov. 2009, BASF, 7 pages.
Bowman, Thiol-Isocyanate-Ene Ternary Networks by Sequential and Simultaneous Thiol Click Reactions, Chemistry of Materials, Apr. 2010, vol. 22, No. 8, pp. 2616-262.
He, "Thiol-epoxy/thiol-acrylate hybrid materials synthesized by photopolymerization", Journal of Materials Chemistry C Aug. 2013, vol. 1, No. 29, pp. 4481-4489.

(Continued)

*Primary Examiner* — Sanza L. McClendon
(74) *Attorney, Agent, or Firm* — Jean A. Lown; Julie Lapos-Kuchar (57) ABSTRACT

The present invention relates to a novel polyurethane-based UV-curable composition, comprising a low-crystallinity polyurethane polymer, a multifunctional thiol compound, a multifunctional epoxy resin compound, a photobase generator, and an optional photosensitizer. Adhesive films, adhesive tapes, and bonded members with excellent initial bonding performance, die cutting performance, overlap strength and drop-resistance performance may be obtained by using the polyurethane-based UV-curable composition provided by the present invention.

16 Claims, 1 Drawing Sheet

(56) References Cited

FOREIGN PATENT DOCUMENTS

| | | |
|---|---|---|
| WO | 2016176537 A1 | 11/2016 |
| WO | 2016195970 A1 | 12/2016 |
| WO | 2017095704 A1 | 6/2017 |

OTHER PUBLICATIONS

International Search Report for PCT International Application No. PCT/IB2021/050024, mailed on Mar. 31, 2021, 4 pages.

Kanji, "Photobase generators: Recent progress and application trend in polymer systems", Progress in Polymer Science, Feb. 2009, vol. 34, No. 3, pp. 194-209.

Kelly-Rowley, "Molecular Recognition of Enolates of Active Methylene Compounds in Acetonitrile. The Interplay between Complementarity and Basicity, and the Use of Hydrogen Bonding to Lower Guest PKaS", Journal of the American Chemical Society, Mar. 1995, vol. 117, No. 12, pp. 3438-3447.

Liu, Thioxanthone acetic acid ammonium salts: highly efficient photobase generators based on Photodecarboxylation, RSC Advances, 2015, vol. 5, No. 66, pp. 53342-53348.

Wang, "Bicyclic Guanidinium Tetraphenylborate: A Photobase Generator and a Photocatalyst for Living Anionic Ring-Opening Polymerization and Cross-Linking of Polymeric Materials Containing Ester and Hydroxy Groups", Journal of the American Chemical Society, 2008, vol. 130, No. 26, pp. 8130-8131.

\* cited by examiner

POLYURETHANE-BASED UV-CURABLE COMPOSITION, ADHESIVE FILM COMPRISING THE SAME, ADHESIVE TAPE AND BONDED MEMBER

CROSS REFERENCE TO RELATED APPLICATIONS

This application is a national stage filing under 35 U.S.C. 371 of PCT/IB2021/050024, filed Jan. 4, 2021, which claims the benefit of Chinese Patent Application No. 202010016476.X, filed Jan. 7, 2020, the disclosure of which is incorporated by reference in its/their entirety herein.

TECHNICAL FIELD

The present invention belongs to the field of adhesives, and in particular, to a polyurethane-based UV-curable composition, an adhesive film comprising the same, an adhesive tape, and a bonded member.

BACKGROUND

With the miniaturization of electronic devices, appropriate bonding adhesive tapes are needed to bond small components. Since the bonding area of these components are generally quite small, bonding adhesive tapes are required to have higher bonding strength than conventional pressure sensitive adhesive tapes. It is known in the art that UV-initiated bonding adhesive tapes have a promising future in electronic applications and can provide semi-structural or structural bonding strength. Yet compared with liquid structural adhesives, UV-curable adhesive tapes or adhesive films have the following advantages: high die cutting performance, desirable initial strength, no adhesive overflow, and precise measurements of thickness. In addition, bonding adhesive tapes must have good drop-resistance performance after bonding, so as to improve the stability and service life of electronic products.

Therefore, an urgent need exists in the field of electronic products to provide an adhesive film or an adhesive tape with strong enough bonding strength (including high initial bonding force and overlap shear strength after curing) and excellent drop-resistance performance.

SUMMARY

In view of the a aforementioned issues, the purpose of the present invention is to provide a novel polyurethane-based UV-curable composition used for obtaining an adhesive film, an adhesive tape, and a bonded member with strong bonding strength (including high initial bonding force and overlap shear strength after curing) and excellent drop-resistance performance.

Therefore, in one aspect, the present invention provides a polyurethane-based UV-curable composition. The polyurethane-based UV-curable composition comprises: (a) a low-crystallinity polyurethane polymer, the crystal melting enthalpy of the low-crystallinity polyurethane polymer tested by adopting a DSC testing method being smaller than 1 J/g, the low-crystallinity polyurethane polymer comprising a reaction product of an isocyanate component and a polyol component; (b) a multifunctional thiol compound, based on every 100 g of the low-crystallinity polyurethane polymer, the multifunctional thiol compound containing 0.01-0.25 mol of a sulfhydryl group; (c) a multifunctional epoxy resin compound, based on every 100 g of the low-crystallinity polyurethane polymer, the multifunctional epoxy resin compound containing 0.01-0.25 mol of an epoxy group; and (d) a photobase generator, based on every 100 g of the low-crystallinity polyurethane polymer, the amount of the photobase generator being 0.3-15.0 g.

In another aspect, the present invention provides an adhesive film. The adhesive film comprises the polyurethane-based UV-curable composition described above.

In another aspect, the present invention provides an adhesive tape. The adhesive tape comprises the adhesive film described above.

The present invention provides a novel polyurethane-based UV-curable composition by using a low-crystallinity polyurethane polymer, a multifunctional thiol compound, a multifunctional epoxy resin compound and a photobase generator to cooperate with one another, and optionally comprising an optional photosensitizer.

The composition can be applied as an adhesive tape or adhesive film and can be used to bond a plurality of structural parts to obtain a bonded member. The adhesive tape or adhesive film obtained by using the polyurethane-based UV-curable composition provided by the present invention has the advantages such as die cutting, desirable initial strength or initial adhesiveness (initial peeling force greater than or equal to 0.4 N/mm) before UV curing, no adhesive overflow, and desirable appearance. Under the excitation of UV light, the photobase generator in the composition produces a basic catalyst which catalyzes the reaction and curing of the curable components (i.e., the multifunctional thiol compound and the multifunctional epoxy resin compound) in the composition, thereby improving the structural strength of the adhesive tape. As such, the adhesive tape, the adhesive film, or the bonded member after UV curing can achieve semi-structural adhesive strength or higher strength (overlap shear strength greater than or equal to 1.5 MPa).

Compared with existing UV-curable compositions or adhesives based on acrylate, the polyurethane-based UV-curable composition or adhesive provided by the present invention not only exhibits better initial adhesiveness, die cutting performance, and higher overlap shear strength, but also exhibits surprisingly better drop-resistance performance. For example, the adhesive tape, the adhesive film, and the bonded member obtained by using the polyurethane-based UV-curable composition provided by the present invention have excellent drop-resistance performance, such that they are capable of sustaining drops from a height of 190 cm for greater than 30 times.

In addition, by using the polyurethane-based UV-curable composition provided by the present invention, the curing can be implemented at room temperature or accelerated at high temperature. Moreover, curing is not affected by moisture and alkaline substances and corrosion does not occur on the surfaces of metal substrates.

DETAILED DESCRIPTION

After detailed research conducted by the inventor of the present invention, it was discovered that by using a polyurethane-based UV-curable composition with specific components, the following could be obtained: an adhesive film, an adhesive tape, and a bonded member with optimal bonding strength (including high initial bonding force and overlap shear strength after curing) and excellent drop-resistance performance.

The polyurethane-based UV-curable composition according to the present invention comprises: (a) a low-crystallinity polyurethane polymer, (b) a multifunctional thiol compound, (c) a multifunctional epoxy resin compound, and (d) a photobase generator, and preferably, further optionally comprises (e) a photosensitizer.

(A) Low-Crystallinity Polyurethane Polymer

The polyurethane-based UV-curable composition provided by the invention is a composition based on a polyurethane polymer. In order to obtain desirable initial adhesiveness and drop-resistance performance, the polyurethane component used in the present invention is a low-crystallinity polyurethane polymer.

As used herein, the term "low-crystallinity polyurethane polymer" refers to a polyurethane polymer with very low crystallinity. As known in the field, the crystallinity of the polyurethane polymer can be detected by using an analytical instrument, and such crystallinity can be judged according to certain factors, such as whether a crystallization peak can be detected by adopting differential scanning calorimetry (DSC). For the purpose of the present invention, as long as the used polyurethane polymer is a low-crystallinity polyurethane polymer, the polyurethane polymer used herein is considered acceptable. The crystal melting enthalpy of the low-crystallinity polyurethane polymer tested by adopting a DSC testing method is smaller than 1 J/g.

Although the present invention has no special limitations on other parameters of the low-crystallinity polyurethane polymer such as molecular weight and glass transition temperature, the low-crystallinity polyurethane polymer used in the present invention typically or preferably has a weight-average molecular weight of at least 20,000 g/mol, at least 50,000 g/mol, and usually no greater than 1,000,000 g/mol.

In addition, compared with the low-crystallinity polyurethane polymer with higher glass transition temperature, a low-crystallinity polyurethane polymer with glass transition temperature lower than 50° C. is preferred in the present invention, and a low-crystallinity polyurethane polymer with glass transition temperature lower than 30° C. is more preferred.

The low-crystallinity polyurethane polymer of the present invention comprises a reaction product of a polyisocyanate component and a polyol component, or may be obtained as a reaction product of a polyisocyanate component and a polyol component.

In the present invention, the term "polyisocyanate component" refers to a multifunctional isocyanate compound containing a plurality of (i.e., 2 or greater than 2) isocyanate functional groups. Examples of such multifunctional isocyanate compound include aliphatic multifunctional isocyanate compounds and aromatic multifunctional isocyanate compounds. Examples of aliphatic multifunctional isocyanate compounds include the following: trimethylene diisocyanate, tetramethylene diisocyanate, hexamethylene diisocyanate (HDI), pentamethylene diisocyanate, 1,2-propylidene diisocyanate, 1,3-butylidene diisocyanate, dodecamethylene diisocyanate and 2,4,4-trimethyl hexamethylene diisocyanate, 1,3-cyclopentene diisocyanate. 1,3-cyclohexane diisocyanate, 1,4-cyclohexane diisocyanate, isophorone diisocyanate (IPDI), hydrogenated diphenylmethane diisocyanate, hydrogenated phenylenedimethylidyne diisocyanate, hydrogenated toluene diisocyanate, hydrogenated tetramethylxylene diisocyanate, and bio-based aliphatic multifunctional isocyanate such as 2-heptyl-3,4-bis (9-isocyanatononyl)-1-pentylcyclohexane that can be obtained from BASF Corporation by commodity name of DDI®1410, etc. Examples of aromatic multifunctional isocyanate compounds include 1,4-methylenediphenyl diisocyanate (MDI), m-tetramethylene diisocyanate (TMXDI), etc. These aliphatic multifunctional isocyanate compounds and aromatic multifunctional isocyanate compounds may be used alone or in any combination.

In the present invention, the term "polyol component" refers to an aromatic and/or aliphatic polyol compound comprising at least two hydroxyl groups in each molecule. The polyol compound is usually a polymer or oligomer. Examples include, but are not limited to, polyester polyol, polyether polyol, polycarbonate polyol, polyolefin polyol, etc. Such polyester polyol may be obtained, for example, through esterification between a polyol component such as aliphatic glycol (e.g., ethylene glycol and diethylene glycol) and an acid component. Examples of aliphatic glycol that can be used include ethylene glycol, diethylene glycol, propylene glycol, 1,3-propanediol, 1,3-butanediol, 1,4-butanediol, 1,5-pentanediol, 1,6-hexanediol, 1,7-heptanediol, 1,8-octanediol, 1,9-nonanediol, 1,10-decanediol, 2,4-dimethyl-2-ethylhexane-1,3-diol, 2,2-dimethyl-1,3-propanediol (neopentyl glycol), 2-ethyl-2-butyl-1,3-propanediol, 2-ethyl-2-isobutyl-1,3-propanediol, 3-methyl-1,5-pentanediol, 2,2,4-trimethyl-1,6-hexanediol, octadecanediol, etc. Examples of the acid component that can be used include succinic acid, methyl succinic acid, adipic acid, heptanedioic acid, azelaic acid, sebacic acid, 1,12-dodecanedioic acid, 1,14-tetradecanedioic acid, dimeric acid, 2-methyl-1,4-cyclohexanedicarboxylic acid, 2-ethyl-1,4-cyclohexanedicarboxylic acid, terephthalic acid, phthalic acid, 1,4-naphthalene dicarboxylic acid, 4,4'-dicarboxylic acid, and anhydride thereof. In the present invention, the following is preferred: a polyol component comprising phthalate or isophthalate, and a repeating unit of an alkylidene group comprising at least 4, 5 or 6 carbon atoms structurally.

In the present invention, a polyol with a number-average molecular weight of equal to or greater than 1000 grams/mol is preferred, and a polyol with a number-average molecular weight of equal to or greater than 2000 grams/mol is more preferred.

In the present invention, the preferred polyol component comprises phthalate or isophthalate, and a polymerization unit of an alkylidene group comprising at least 4 carbon atoms.

The polyol component applicable to the present invention comprises a polymeric polyester polyol with the following structure:

where
R₁ is independently an alkylidene group comprising at least 4 carbon atoms;
n is greater than or equal to 2; and
the ester group substituent group is bonded to the ring at the ortho-position or meta-position.

The polyol component applicable to the present invention further comprises a polyol containing a cross-linkable functional group, and the cross-linkable functional group is selected from the group consisting of carboxyl, double bond, epoxy group, and a combination thereof.

In some implementation solutions, the aromatic polyester polyol reacts with the isocyanate component, such that the molar ratio of hydroxyl group (OH group) to NCO isocyanate group (NCO group) is about 1:1. The hydroxyl content of the obtained polyurethane is no greater than about 0.5 wt %. In some implementation solutions, the polyurethane polymer may be prepared through the reaction of an ideal proportion of excess organic polyisocyanate. The molar ratio of NCO to OH is usually about 1.1:1, 1.05:1, 1.01:1, 1:1.01, 1:1.05 or 1:1.1.

When the polyol component is enabled to react with the polyisocyanate component, according to the reactants and the catalyst selected, the reaction temperature is usually in a temperature range from about 60° C. to about 90° C. The reaction time is usually in a range of about 2 hours to about 48 hours.

The polyurethane composition is usually prepared by using a catalyst known in the field. The amount of the catalyst may be, at most, about 0.5 wt % based on the total weight of polyurethane composition. In some implementation solutions, the amount of the catalyst is in a range of from about 0.001 wt % to about 0.05 wt % of polyurethane composition. Examples of catalysts that can be used include, but are not limited to, those selected from tin II and IV salts such as stannous octoate, dibutyltin dilaurate and dibutyltin diacetate; and tertiary amine compounds such as triethylamine and bis(dimethylaminoethyl) ether, morpholine compounds such as β, β'-dimorpholine diethyl ether, bismuth carboxylate, zinc bismuth carboxylate, iron chloride (III), potassium octanate, and potassium acetate.

A solvent may be used to control the polyurethane viscosity. Examples of available solvent added for this purpose (which is usually a volatile organic compound) include, but are not limited to, ketone (e.g., methyl ethyl ketone and acetone), tertiary alcohol, ether, ester (e.g., ethyl acetate), amide, hydrocarbon, chlorohydrocarbon, chlorocarbon, and a mixture thereof. The polyurethane polymer is usually used in solution containing an organic solvent, and the solid content is usually 30-70 wt %.

Determination is done by using the determination method in the embodiments. In the present invention, preferably, the obtained low-crystallinity polyurethane usually has a weight-average molecular weight (Mw) of 20,000 g/mol, 30,000 g/mol, 40,000 g/mol, 50,000 g/mol, 80,000 g/mol or 100,000 g/mol, 150,000 g/mol or 200,000 g/mol, and usually not greater than 1,000,000 g/mol or 500,000 g/mol.

In addition, for one skilled in the art, the required low-crystallinity polyurethane polymer may be easily obtained in the synthesis process by controlling the components and content of of hard and soft segments, as well as the relative molecular weight of hard and soft segments in, for example, the target polyurethane polymer, and by selecting suitable polyisocyanate or other crystallization inhibition components. For example, when polyisocyanate such as HDI is used, due to the molecular chain regularity of the synthesized polymer, it is possible to enable the synthesized polymer to have high crystallinity. Therefore, one skilled in the art can easily think of using asymmetric polyisocyanate such as IPDI to obtain a polyurethane polymer with high degree of isomerization, thereby possibly causing the molecular chains of the obtained polyurethane polymer to be in a random arrangement state, thereby obtaining the low-crystallinity polyurethane polymer required by the present invention. In other words, for one skilled in the art, in the actual synthesis and preparation of the low-crystallinity polyurethane polymer, the synthesis conditions are easily adjusted (including the types and amounts of raw materials, various parameters of the synthesis process, etc.) according to different actual situations, such that the low-crystallinity polyurethane polymer required by the present invention can be obtained.

(B) Multifunctional Thiol Compound

In the present invention, the used multifunctional thiol compound refers to a compound with equal to or greater than 2, preferably equal to or greater than 3, sulfhydryl groups (thiol group) in each molecule. Examples of the multifunctional thiol compound include, but are not limited to, trihydroxymethylpropane trithiopropionate, pentaerythritol tetrathiopropionate, glycol dimercaptoacetate, 1,4-butanediol dimercaptoacetate, trihydroxymethylpropane trimercaptoacetate, pentaerythritol tetramercaptoacetate, di(2-mercaptoethyl) ether, 1,4-butanethiol, 1,5-dimercapto-3-thiopentane, 1,8-dimercapto-3,6-dioxaoctane, 1,3,5-trimercapto methylphenyl, 4,4'-dimercaptophenyl sulfide, 1,3,5-trimercaptomethyl-2,4,6-trimethylbenzene, 2,4,6-trimercapto-s-triazine, 2-dibutylamino-4,6-dimercapto-s-triazine, pentaerythritol tetra (3-mercaptopropionate), pentaerythritol hexa-3-mercaptopropionate, polyether containing terminal sulfhydryl groups, polythioether containing terminal sulfhydryl groups, a thiol compound obtained by the reaction of an epoxy compound with hydrogen sulfide, a thiol compound with terminal sulfhydryl groups obtained by the reaction of a polythiol compound with an epoxy compound, etc. When considering the choices as to how to facilitate the curing process, preferably, the thiol compound with equal to or greater than 3 sulfhydryl groups will be selected.

Commercially available products of the multifunctional thiol compound that can be used in the present invention include, but are not limited to, JER mate QX11, QX12, JER cure QX30, QX40, QX60, QX900 and Kapukyua CP3-800 manufactured by Japan Epoxy Resins, Co., Ltd.; OTG, EGTG, TMTG, PETG, 3-MPA and PETP manufactured by Starch Chemical Co., Ltd.; TEMPIC, TMMP, PEMP, PEMP-II-20P and DPMP manufactured by Sakai Chemical Industry Co., Ltd.; Thiokol LP-2, LP-3 and polythiol QE-340M manufactured by Toray Fine Chemicals Co., Ltd.; Karenz MT PEI, NR1 and TPMB manufactured by Showa Denko Group; and PETMP manufactured by TCI Co., Ltd., etc.

In the present invention, the thiol compounds may be used alone or a mixture of equal to or greater than 2 thiol compounds may be used. It will be understood by one skilled in the art that when the used thiol compound is a mixture, the number of sulfhydryl groups therein may refer to the average number of sulfhydryl groups of the molecule in the mixture. In this case, for the present invention, even if the mixture further contains a small amount of thiol compound with only one sulfhydryl group in each molecule, it is possible to implement the present invention as long as the average number of sulfhydryl groups in the mixture is equal to or greater than 2 and more preferably equal to or greater than 3.

In the UV-curable composition of the present invention, based on every 100 g of the low-crystallinity polyurethane polymer, the lower limit of the molar amount of the sulfhydryl groups in the multifunctional thiol compound is 0.01 mol, 0.015 mol, or 0.016 mol, and the upper limit of the molar amount of the sulfhydryl groups in the multifunctional thiol compound is 0.25 mol, or 0.205 mol. When the amount of the sulfhydryl groups contained in the polyurethane-based UV-curable composition based on every 100 g of the low-crystallinity polyurethane polymer is in the range as described above, the adhesive tape/adhesive film prepared by using the polyurethane-based UV-curable composition provided by the present invention has higher cohesion strength, better initial adhesiveness, and higher overlap shear strength.

(C) Multifunctional Epoxy Resin Compound

The multifunctional epoxy resin compound used in the present invention refers to an epoxy resin compound with equal to or greater than 2 epoxy groups in each molecule.

The multifunctional epoxy resin compound generally includes glycidyl ethers of etherified multifunctional phenols, glycidyl amines of epoxidized multifunctional amines, glycidyl esters of esterified multifunctional acids, etc.

Examples of glycidyl ether epoxy resins include bisphenol A epoxy resin (also known as E epoxy resin), tetrabromobisphenol A epoxy resin, hydrogenated bisphenol A epoxy resin, bisphenol F epoxy resin, bisphenol S epoxy resin, linear phenol aldehyde polyglycidyl ether, linear orthophenyl-phenol formaldehyde polyglycidyl ether, and resorcinol formaldehyde epoxy resin.

Glycidyl amine epoxy resins are obtained through a reaction of polyamines as raw materials. Examples include triglycidyl triisocyanate (TGIC), triglycidyl p-aminophenol (TGPAP), tetraglycidyl diaminodiphenyl methane (TGDDM), diisopropylphenylene tetraglycidylamine (TGBAP), tetramethylisopropylphenylene tetraglycidylamine (TGMBAP), N,N,N',N'-tetraepoxypropyl-4,4-diaminodiphenylmethane (TCDN), N,N,N',N'-tetraglycidyl-2,2-bis [4-(4-aminophenoxy)phenyl] propane (TGBAPOPP), N,N, N',N'-tetraglycidyl-4,4'-methylenedio-toluidine (TGMDT), and 4,4'-diaminodiphenyl ether tetraglycidylamine (TGDAE).

Examples of glycidyl ester epoxy resins include diglycidyl phthalate, diglycidyl hexahydrophthalate, diglycidyl terephthalate, diglycidyl isophthalate, diglycidyl tetrahydrophthalate, diglycidyl methyl tetrahydrophthalate, diglycidyl endomethenyl tetrahydrophthalate, diglyeidyl adipate, etc.

In the present invention, a liquid multifunctional epoxy resin compound may be used, or a solid multifunctional epoxy resin compound may be used.

In the present invention, the multifunctional epoxy resin compounds may be used alone, or a mixture of equal to or greater than 2 multifunctional epoxy resin compounds may be used. It will be understood by one skilled in the art that in the case that the used epoxy resin compound is a mixture. The number of epoxy groups therein may refer to the average number of epoxy groups of the molecule in the mixture. In this case, for the present invention, even if the mixture further contains a small amount of epoxy resin compound with only one epoxy group in each molecule, it the present invention remains achievable as long as the average number of epoxy groups in the mixture is equal to or greater than 2.

In the polyurethane-based UV-curable composition of the present invention, based on every 100 g of the low-crystallinity polyurethane polymer, the lower limit of the molar amount of the epoxy group in the multifunctional epoxy resin compound is 0.01 mol or 0.015 mol, and the upper limit of the molar amount of the epoxy groups in the multifunctional epoxy resin compound is 0.25 mol or 0.205 mol.

When the amount of the epoxy group contained in the polyurethane-based UV-curable composition based on every 100 g of the low-crystallinity polyurethane polymer is in the above-mentioned range, the adhesive tape/film prepared by using the composition provided by the present invention has higher cohesion strength, better initial adhesiveness, and higher overlap shear strength.

In the UV-curable composition provided by the present invention, the multifunctional thiol compound and the multifunctional epoxy resin compound may be combined together and are collectively referred to as curable components. From the standpoint of obtaining excellent drop-resistance performance and good overlap shear strength and push-out force, the molar ratio of the sulfhydryl groups in the multifunctional thiol to the epoxy group in the multifunctional epoxy resin is preferably 1:3-3:1, 1:2-2:1, 1.2:1-1:1.2, or 1:1. If the moles of the sulfhydryl groups in the multifunctional thiol compound are relatively too high or too low, it may lead to poor bonding strength and poor drop-resistance performance.

(D) Photobase Generator

Photobase generators are a group of compounds that can produce alkaline substances under light irradiation. Examples of common photobase generators include cobalt ammonia complexes, oxime esters, quaternary ammonium salts, borates, etc. A photobase generator is used in the present invention. Such photobase generators are known in the prior art, such as those disclosed in the reference articles listed in the background of the present application (Photobase generators: Recent progress and application trend in polymer systems; Kanji Suyama, Masamitsu Shirai and others, Progress in Polymer Science, 2009, 34, 194-209, WO2003033500A1 (Baudin et al.) and WO2015083331A1 (Ikeda et al.), which are incorporated herein by reference). These photobase generates can be used in the present invention as long as they can produce alkaline catalysts that can effectively catalyze the reaction of thiol and epoxy under light irradiation, i.e., to function as a catalyst and satisfy requirements herein.

In the composition provided by the present invention, the photobase generator produces an alkaline catalyst to catalyze the curing reaction. The curing is not impacted by influence of moisture and alkaline substances as is the case with the photoacid curing; does not cause corrosion on the surfaces of metal substrates; and has high curing efficiency. A small amount of photobase generator can catalyze the cross-linking reaction, and the curing has a strength comparable with that of semi-structural or structural adhesives.

As a photobase generator, commercially available products or synthesized products may be used. For synthesis thereof, one may refer to the methods in the references (Refer to "Molecular Recognition of Enolates of Active Methylene Compounds in Acetonitrile. The Interplay between Complementarity and Basicity, and the Use of Hydrogen Bonding to Lower Guest PKaS" by Anne M. Kelly-Rowley, Vincent M. Lynch, Eric V. Anslyn et al., J. Am. Chem. SOC. 1995, 117, 3438-3447).

In the polyurethane-based UV-curable composition provided by the present invention, the amount of the photobase generator used in the present invention may be reasonably determined according to the components of the composition to be cured and the content of the components. Based on every 100 g of the low-crystallinity polyurethane polymer, the lower limit of the content of the photobase generator in the polyurethane-based UV-curable composition is 0.3 g, 0.4 g, or 0.5 g, whereas the upper limit of the content of the photobase generator is 11.5 g, 12.0 g, or 15.0 g. When the content of the photobase generator is in the above-mentioned range, the polyurethane-based UV-curable composition can be fully cured, the overlap shear strength is higher, and the following issue can be avoided: the photobase generator precipitating from the curable composition when the content of the photobase generator is too high, thereby possibly affecting the initial adhesiveness and final bonding performance of the curable composition. On the contrary, if the content of the photobase generator in the composition is too low, the curing of the composition may be insufficient, resulting in poor bonding force, and if the content of the photobase generator in the composition is too high, the photobase generator may be precipitated from the adhesive film, resulting in opacity of the adhesive film and the decrease in initial adhesiveness. In the present invention, preferably, a photobase generator with strong catalytic activity, such as a photobase generator that can generate 1,5-diazabicyclo [4.3.0]non-5-ene (DBN), 1,8-diazabicyclo [5.4.0] undec-7-ene (DBU), 1,5,7-triadiazabicyclo [4.4.0] deca-5-ene or 1,1,3,3-tetramethylguanidine and other super bases, may be adopted.

(E) Photosensitizer

The polyurethane-based UV-curable composition provided by the present invention may optionally further comprise a photosensitizer. A photosensitizer is a compound that increases the sensitivity or reactivity of the additives to light. Whether the sensitivity increase mechanism is energy transfer, electron transfer, or proton transfer, in the composition provided by the present invention, the combination of the photosensitizer and the photobase generator can increase the activity of the composition to light without being limited by any specific theories, thereby reducing the use amount of the photobase generator in the composition, and further facilitating a smooth curing reaction. Specifically, preferably fluorene, fluorenone, anthraquinone, anthrone, fluoranthene, benzyl ketal, a-hydroxyacetophenone, benzoin, aminoacetophenone, oximinoketone, acyl phosphine oxide, naphthalene derivatives, anthracene derivatives, nitrobenzoic acid, nitroaniline or pigments such as riboflavin, rose red, eosin, erythrosine, methylene blue, or new methylene blue red are used, so as to achieve desirable compatibility with light curing performance and excellent light curing performance.

In the composition provided by the present invention, preferably, based on every 100 g of the low-crystallinity polyurethane polymer, the composition contains 0.1-8.0 g, preferably 0.25-7.2 g of the photosensitizer.

Other Components

As known by one skilled in the art, the composition provided by the present invention may contain other components such as solvents according to actual application requirements. No special limitation exists regarding the types and content of these other components, as long as the curability, bonding strength, and drop-resistance performance of the composition provided by the present invention are not affected. Moreover, in the case that the composition provided by the present invention contains a solvent, the contents of the above-mentioned components (a)-(e) and the weight of the composition are measured by dry weight.

In addition, the UV-curable composition provided by the present invention may optionally comprise one or a plurality of conventional additives, such as (e.g., inorganic) fillers (such as silicon dioxide and glass bulbs obtained by pyrolysis, thermal conducting fillers and electric conducting fillers), tackifiers, adhesive promoters, plasticizers, chemical foaming agents, thixotropic agents, ultraviolet stabilizers, antioxidants, anti-static agents, colorants, anti-impact aids, and flame retardants (such as zinc borate). The use and use amounts of these additives are determined according to the actual needs, which should not affect the curability, bonding strength and drop-resistance performance of the composition provided by the present invention.

Adhesive Film/Adhesive Tape

In the present invention, the adhesive film may consist of the polyurethane-based UV-curable composition provided by the present invention. An adhesive tape may be obtained by coating the polyurethane-based UV-curable composition provided by the present invention onto a substrate, release film, or release paper to form an adhesive film. The adhesive tape may adopt the common structure used in the field. The polyurethane-based UV-curable composition provided by the present invention may be coated onto a flexible and non-flexible substrate (including release film or release paper) by using a conventional coating technology to form an adhesive film/adhesive tape. For example, the composition may be applied by methods such as roll coating, flow coating, dip coating, spin coating, spray coating, scraping, and die coating. For example, the adhesive tape may be a no-substrate adhesive tape with a release film or release paper on both sides of the adhesive film, a single-sided adhesive tape with a backside substrate on one side and a release film or release paper on the other side, or a double-sided adhesive tape having a substrate with adhesive films on both sides of the substrate, and release films or release paper on the adhesive films on both sides.

Figure 1:
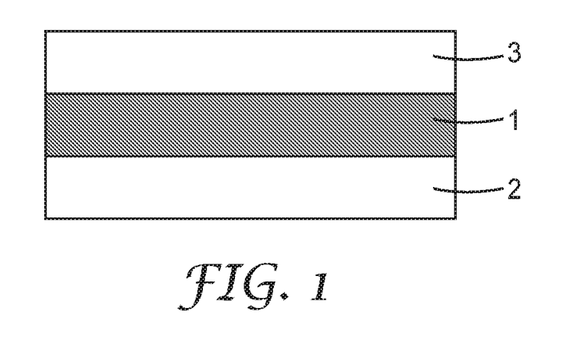
FIG. 1 illustrates a schematic view of a double-sided adhesive tape not comprising a substrate obtained by using a polyurethane-based UV-curable composition provided by the present invention.

As an example, FIG. 1 illustrates a schematic view of a double-sided adhesive tape not comprising a substrate obtained by using a polyurethane-based UV-curable composition provided by the present invention. As illustrated in FIG. 1, the double-sided adhesive tape comprises an adhesive film (1) made of the UV-curable composition provided by the present invention, and release films or release paper (2, 3) on both sides of the adhesive film (1), wherein the release films or release paper (2, 3) on both sides of the adhesive film maybe the same or different. As the release films or release paper (2, 3), release films or paper known in the prior art, such as PET release films, glass paper, laminated paper, and polypropylene thin films, may be used.

Figure 2:
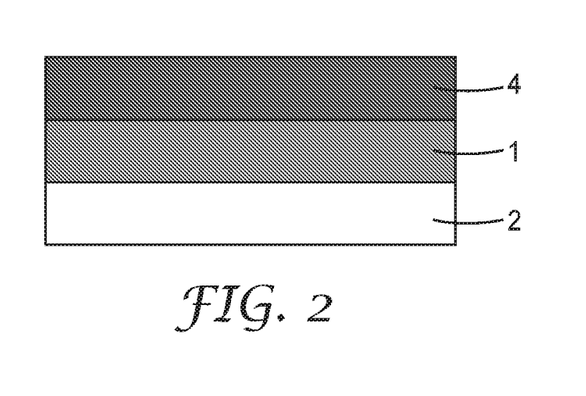
FIG. 2 illustrates a schematic view of a single-sided adhesive tape not comprising a substrate obtained by using a polyurethane-based UV-curable composition provided by the present invention.

As another example, FIG. 2 illustrates a schematic view of a single-sided adhesive tape not comprising a substrate obtained by using a polyurethane-based UV-curable composition provided by the present invention. As illustrated in FIG. 2, the single-sided adhesive tape comprises an adhesive film (1) made of the UV-curable composition provided by the present invention, a release film or release paper (2) on one side of the adhesive film (1), and a backside substrate (4) on the other side of the adhesive film (1), wherein a known substrate which includes, but is not limited to, a polymer film, a woven or non-woven fabric, a metal foil, foam and a combination thereof, may be used as the backside substrate (4) of the adhesive tape.

Figure 3:
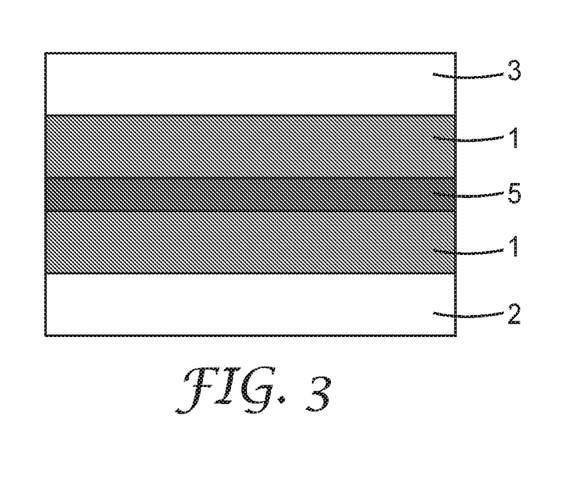
FIG. 3 illustrates a schematic view of a double-sided adhesive tape comprising a substrate obtained by using a polyurethane-based UV-curable composition provided by the present invention.

As another example, FIG. 3 illustrates a schematic view of a double-sided adhesive tape comprising a substrate obtained by using a polyurethane-based UV-curable composition provided by the present invention. As illustrated in FIG. 3, the double-sided adhesive tape comprises a substrate (5), an adhesive film (1) and a release film or release paper (2, 3) on two sides, wherein the substrate (5) may be the known substrate as described above.

In some implementation solutions, the bonding strength is further enhanced by bonding the substrate with the adhesive bonded to the substrate through initial adhesiveness at ambient temperature (e.g., 25° C.) and then heating it to the desired temperature in an oven.

The concentration of the polyurethane-based UV-curable composition may be any desired concentration suitable for subsequent coating. The solid content of the composition in an organic solvent is usually at least 20 wt %, at least 25 wt %, or at least 40 wt %. In some implementation solutions, the coating contains the composition having a solid content greater than 60 wt %.

There is no specific requirement on the thickness of the adhesive film, which is usually at least 5 microns, 10 microns, 15 microns, 20 microns or 25 microns. The thickness of the adhesive film may reach 500 microns at most. In some implementation solutions, the thickness of the adhesive film is at most 400 microns, 300 microns, 200 microns or 100 microns.

Bonded Member

The polyurethane-based UV-curable composition or adhesive film/adhesive tape provided by the present invention may be used for bonding parts of various products (such as mobile phones, computers, smart watches and automotive rear view mirrors), so as to form a bonded member.

The bonded member usually comprises a first part and a second part bonded by using the polyurethane-based UV-curable composition or adhesive film, wherein the first part and the second part may be the same or different, and may be various parts or components that can be bonded. When the adhesive film is used, one of the first part and the second part may be an adhesive backing material.

EMBODIMENTS

The present invention will be further described below in detail with reference to the embodiments. It should be understood that the present invention is not limited to the following embodiments. Unless otherwise specified, "parts" refers to "parts by weight," "%" refers to "wt %," and "g" refers to weight unit "gram."

List of Specific Embodiments

1. A polyurethane-based UV-curable composition, the polyurethane-based UV-curable composition comprising:
   (a) a low-crystallinity polyurethane polymer, the crystal melting enthalpy of the low-crystallinity polyurethane polymer tested by adopting a DSC testing method being smaller than 1 J/g, the low-crystallinity polyurethane polymer comprising a reaction product of an isocyanate component and a polyol component;
   (b) a multifunctional thiol compound, based on every 100 g of the low-crystallinity polyurethane polymer, the multifunctional thiol compound containing 0.01-0.25 mol of a sulfhydryl group;
   (c) a multifunctional epoxy resin compound, based on every 100 g of the low-crystallinity polyurethane polymer, the multifunctional epoxy resin compound containing 0.01-0.25 mol of epoxy groups; and
   (d) a photobase generator, based on every 100 g of the low-crystallinity polyurethane polymer, the amount of the photobase generator being 0.3-15.0 g.

2. The polyurethane-based UV-curable composition according to specific embodiment 1, wherein based on every 100 g of the low-crystallinity polyurethane polymer, the polyurethane-based UV-curable composition comprises:
   the multifunctional thiol compound containing 0.016-0.205 mol of a sulfhydryl group;
   the multifunctional epoxy resin compound containing 0.016-0.205 mol of an epoxy group; and
   0.5-11.5 g of the photobase generator.

3. The polyurethane-based UV-curable composition according to specific embodiment 2, wherein based on every 100 g of the low-crystallinity polyurethane polymer, the polyurethane-based UV-curable composition comprises:
   the multifunctional thiol compound containing 0.07-0.205 mol of a sulfhydryl group; and
   the multifunctional epoxy resin compound containing 0.07-0.205 mol of an epoxy group.

4. The polyurethane-based UV-curable composition according to any one of specific embodiments 1 to 3, wherein the molar ratio of the sulfhydryl groups in the multifunctional thiol compound to the epoxy group in the multifunctional epoxy resin compound is in a range from 1.2:1 to 1:1.2.

5. The polyurethane-based UV-curable composition according to any one of specific embodiments 1 to 4, wherein the molar ratio of the sulfhydryl groups in the multifunctional thiol compound to the epoxy group in the multifunctional epoxy resin compound is 1:1.

6. The polyurethane-based UV-curable composition according to any one of specific embodiments 1-5, wherein the multifunctional thiol compound is a thiol compound with equal to or greater than 3 sulfhydryl groups in each molecule.

7. The polyurethane-based UV-curable composition according to any one of specific embodiments 1 to 6, wherein the number-average molecular weight of the polyol component is equal to or greater than 1000 g/mol, preferably equal to or greater than 2000 g/mol.

8. The polyurethane-based UV-curable composition according to any one of specific embodiments 1 to 7, wherein the polyol component comprises phthalate or isophthalate, and a repeating unit of an alkylidene group comprising at least 4 carbon atoms.

9. The polyurethane-based UV-curable composition according to any one of specific embodiments 1 to 8, wherein the polyol component comprises a polymeric polyester polyol with the following structure:

where
R₁ is independently an alkylidene group comprising at least 4 carbon atoms,
n is greater than or equal to 2, and
the ester group substituent group is bonded to the ring at the ortho-position or meta-position.

10. The polyurethane-based UV-curable composition according to any one of specific embodiments 1 to 9, wherein the polyol component further comprises a polyol containing a cross-linkable functional group, and the cross-linkable functional group is selected from the group consisting of carboxyl, double bond, epoxy group, and a combination thereof.

11. The polyurethane-based UV-curable composition according to any one of specific embodiments 1 to 10, wherein the polyurethane-based UV-curable composition further comprises a photosensitizer.

12. The polyurethane-based UV-curable composition according to specific embodiment 11, wherein based on every 100 g of the low-crystallinity polyurethane polymer, the polyurethane-based UV-curable composition comprises 0.1-8.0 g of the photosensitizer.

13. An adhesive film, comprising the polyurethane-based UV-curable composition according to any one of specific embodiments 1 to 12.

14. The adhesive film according to specific embodiment 13, wherein the initial peeling force of the adhesive film before UV curing is greater than 0.4 N/mm, the overlap shear strength after UV curing is greater than 1.5 MPa, and the adhesive film has drop-resistance performance that the adhesive film is capable of surviving drops from a height of 190 cm for greater than 30 times.

15. An adhesive tape, comprising the adhesive film according to any one of specific embodiment 13 or 14.

16. The adhesive tape according to specific embodiment 15, wherein the adhesive tape further comprises a release film or release paper on one or two sides of the adhesive film.

Testing Method

Differential Scanning Calorimetry (DSC) Testing

The crystallinity of the polyurethane polymer is characterized by using DSC. DSC testing was carried out under nitrogen protection by using a US TA Company's Instruments Q200 DSC. The testing method was as follows: 5-10 mg of samples were weighed, the temperature was firstly kept constant at a temperature of −80° C. for 1 min, and then the temperature was increased from −80° C. to 200° C. at temperature increase speed of 20 K/min; the temperature was kept constant at a temperature of 200° C. for 5 min, then the temperature was decreased to −80° C. at temperature decrease speed of 3K/min; and then the temperature was increased to 200° C. at speed of 10 K/min. Whether there was a crystallization peak or melting peak on the temperature drop curve and the second-round temperature rise curve was observed. If yes, the absorbed heat was measured and the crystal melting enthalpy (J/g) was calculated.

X-Ray Diffraction (XRD) Testing

The crystallinity of the polyurethane polymer may also be characterized by using XRD. One-dimensional wide-angle x-ray diffraction data were collected at room temperature by using Bruker D8 Advance (KA radiation of copper was filtered by a nickel plate). The working voltage of the instrument was 40 kv and the current of the light pipe was 40 mA. The scanning angle 2θ was from 10° to 90°. The diffraction peaks were calibrated by using standard alpha-$Al_2O_3$. Eva (Bruker) was used to perform peak fitting processing to amorphous scattering and crystal diffraction, so as to calculate the crystallinity.

Test of Initial Peeling Force

The force needed to peel off the adhesive tape at an angle of 180° was tested and measured. The peeling force testing method in ASTM D3330 was used to test the adhesive films/adhesive tapes obtained in the Embodiments 1-17 (E1-E17) and comparative examples 1-7 (C1-C7). Details are as follows:

TABLE of

| Raw Materials | | |
| --- | --- | --- |
| Name (Abbreviated) | Description | Manufacturer or seller |
| PPG2000 | Polyether polyol, $M_W$ = 2000 g/mol | Sinopharm (China) |
| 1901 | Polyester polyol, $M_W$ = 2000 g/mol | Croda (China) |
| PH56 | Polyester polyol, $M_W$ = 2000 g/mol | Stepan (China) |
| T5652 | Polycarbonate polyol, $M_W$ = 2000 g/mol | Asahi Kasei (China) |
| TMPAE | Trihydroxymethylpropyl allyl ether | Sinopharm (China) |
| DMPA | 2,2-bis(hydroxymethyl)propionic acid | Sinopharm (China) |
| DBTDA | Dibutyltin diacetate | Alfa Aesar (China) |
| HDI | Polyisocyanate | Convestro (China) |
| MDI | Polyisocyanate | Convestro (China) |
| RD1054 | Aziridine cross-linking agent | 3M (China) |
| PBD02 | Photobase generator | San Apro limited Co. (China) |
| EAQ | 2-Ethylanthraquinone | Sinopharm (China) |
| PETMP | Multifunctional thiol compound | TCI (China) |
| KarenzMT PE1 | Multifunctional thiol compound | Showa Denko (China) |
| Epon828 | Epoxy resin compound | Hexion (China) |
| NPES901 | Epoxy resin compound | Nanya (China) |
| MEK | Butanone (solvent) | Sinopharm (China) |
| EA | Ethyl acetate | Sinopharm (China) |
| 1176 | Photoacid generator | Two bond Chemical Co. (China) |
| MA | Methyl acrylate | Huayi (China) |
| BA | Butyl acrylate | Huayi (China) |
| GMA | Glycidyl methacrylate | Mitsubishi (China) |
| VAZO 67 | Initiator | Dupont (China) |
| HF-3H95SL | High-crystallinity polyurethane polymer | Huafon (China) |

Stainless steel films were wiped three times with isopropanol before test. A single-sided adhesive tape using a 50 micron-thick polyester (PET) film as a backing substrate was cut into 12.7 cm×15 cm sample blocks. The release film was removed, and the adhesive tape was attached to a stainless steel plate and was rolled twice with a force of 2 kg. Before the peeling force test, the adhesive tape was placed in a controlled environment room (23° C./50% relative humidity) for 30 minutes.

Tests were performed by using an Instron tension tester at speed of 12 in/min. Each test was repeated twice to get the average value in N/mm.

Test of Peeling Force After Curing

The force needed to peel off the adhesive tape at an angle of 180 degrees was tested and measured. The peeling force testing method in ASTM D3330 was used to test the adhesive tapes obtained in the embodiments. Details were as follows:

The stainless steel plates were wiped with isopropanol three times before the test. A single-sided adhesive tape using a 50 micron-thick PET film as a backing substrate was cut into 12.7 cm×15 cm sample blocks. The release film was removed, and the adhesive tape was attached to a stainless steel plate and was rolled twice with a force of 2 kg. UV irradiation (Fusion D lamp, UVA about 3000 mJ/cm$^2$) was performed for curing. After that, the test sample strips were cured for 3 days in a controlled environment room (23° C./50% relative humidity), and then tests were performed; or the prepared sample strips were cured for 1 hour at accelerated speed in an oven at a temperature of 80° C. After being removed from the oven, the test sample strips were placed for 1 day in the controlled environment room (23° C./50% relative humidity), and then measurement was performed.

Tests of peeling force after curing were performed to the test sample strips by using an Instron tension tester at speed of 12 in/min. Each test was repeated twice to get the average value in N/mm.

Test of Overlap Shear Strength (OLS)

The overlap shear strength was tested according to ASTM 1002. Details are as follows:

Aluminum sample strips (4 in×1 in×0.079 in) were wiped 3 times with isopropanol before test. An adhesive film sample with release films on both sides was cut into 0.5 in×1 in; the release film on one side was removed and the adhesive film was attached to an aluminum strip. The release film on the other side was removed; UV irradiation (Fusion D lamp, UVA about 3000 mJ/cm$^2$) was performed; and another aluminum strip was attached onto the other side of the adhesive film. The test sample strips were cured for 3 days in a controlled environment room (23° C./50% relative humidity), and then tests were performed; or the prepared sample strips were cured for 1 hour at accelerated speed in an oven at a temperature of 80° C. After being removed from the oven, the test sample strips were placed for 1 day in the controlled environment room (23° C./50% relative humidity), and then measurement was performed.

Tests of overlap shear strength were performed by using an Instron tension tester at moving speed of 5.0 mm/min. Each test was repeated thrice to get the average value in MPa.

Test of Push-Out Force

Three layers of adhesive film were stacked to form an adhesive film with thickness of about 200 microns; the release film on one side was removed; the adhesive film was attached onto a polymethacrylate (PMMA) plate (length: 70 mm, width: 50 mm, thickness: 1.8 mm); and UV irradiation (Fusion D lamp, UVA about 3000 mJ/cm$^2$) was performed for curing. The release film on the other side was removed; the other side of the adhesive film was attached onto the center of a hollow PMMA plate (length: 85 mm, width: 65 mm, thickness: 4.2 mm). The overlap width between the two plates was about 3 mm. The test sample strips were cured for 3 days in a controlled environment room (23° C./50% relative humidity), and then tests were performed; or the prepared sample strips were cured for 1 hour at accelerated speed in an oven at a temperature of 80° C. After being removed from the oven, the test sample strips were placed for 1 day in the controlled environment room (23° C./50% relative humidity), and then measurement was performed.

Tests of push-out force were performed by using an Instron tension tester at moving speed of 10.0 mm/min. Each test was repeated twice to get the average value in N.

Test of Drop-Resistance Performance

PMMA (10 cm×5 cm×3 mm) and aluminum plates (10 cm×5 cm×3 mm) were used as substrates for drop tests. Aluminum plates were wiped three times with isopropanol before test. Two adhesive films with length of 5 cm, width of 2 mm and thickness of 200 μm were attached in parallel onto positions near two ends of the PMMA plate; and the long sides of the adhesive films were in parallel with the short sides of the PMMA plates. UV irradiation (Fusion D lamp, UVA about 3000 mJ/cm$^2$) was performed, and the aluminum plate was attached onto the other side of the adhesive film. The test sample strips were placed in a controlled environment room (23° C./50% relative humidity) for post-curing for 3 days; and then tests were performed. Or the prepared sample strips were cured for 1 hour at accelerated speed in an oven at a temperature of 80° C. After being removed from the oven, the test sample strips were placed for 1 day in the controlled environment room (23° C./50% relative humidity), and then measurement was performed.

Drop tests were performed by using a directional drop tester (Beijing Wohua). The test height was respectively 70 cm, 120 cm, and 190 cm. Firstly, the test samples were placed at the lowest height to record the times of drop required for bonding failure of the samples to take place. If the two bonded parts were not separated after dropped from this height, the bond was still considered as effective. If the samples passed 30 times of drop tests, the height was increased to the next level; and the drop tests were resumed; and the times of drop required for bonding failure of the samples to take place were recorded. The maximum height and maximum times that the samples finally survived were recorded; each test was repeated twice.

Low-Crystallinity Polyurethane Polymer

Synthesis Example 1

300 g of PH-56, 1.4 g of TMPAE and 300 g of butanone were added into a pressure reactor equipped with a mechanical stirrer, a condenser, and a heating device. The obtained mixture solution was heated to 75° C., then 0.2 g of DBTDA and 27 g of HDI were added therein during stirring; the reaction temperature was kept at 75±2° C. until no free NCO group was observed by infrared spectroscopy (IR); and thus clear and transparent polyurethane solution was obtained. Finally, butanone was added therein to adjust the solid content of the obtained polyurethane solution to 40%. It was recorded as PU-1.

Synthesis Example 2

300 g of PH-56 and 300 g of butanone were added into a pressure reactor equipped with a mechanical stirrer, a condenser, and a heating device. The obtained mixture solution was heated to 75° C., then 0.2 g of DBTDA and 25.2 g of HDI were added therein during stirring; the reaction temperature was kept at 75±2° C. until no free NCO group was observed by IR; and thus clear and transparent polyurethane solution was obtained. Finally, butanone was added therein to adjust the solid content of the obtained polyurethane solution to 40%. It was recorded as PU-2.

Synthesis Example 3

300 g of PH-56 and 300 g of butanone were added into a pressure reactor equipped with a mechanical stirrer, a condenser, and a heating device. The obtained mixture solution was heated to 75° C., then 0.2 g of DBTDA and 36.6 g of HDI were added therein during stirring; the reaction temperature was kept at 75±2° C. until no free NCO group was observed by IR; and thus clear and transparent polyurethane solution was obtained. Finally, butanone was added therein to adjust the solid content of the obtained polyurethane solution to 40%. It was recorded as PU-3.

Synthesis Example 4

300 g of PH-56, 1.5 g of DMPA and 300 g of butanone were added into a pressure reactor equipped with a mechanical stirrer, a condenser, and a heating device. The obtained mixture solution was heated to 75° C., then 0.2 g of DBTDA and 27.1 g of HDI were added therein during stirring; the reaction temperature was kept at 75±2° C. until no free NCO group was observed by IR; and thus clear and transparent polyurethane solution was obtained. Finally, butanone was added therein to adjust the solid content of the obtained polyurethane solution to 40%. It was recorded as PU-4.

Synthesis Example 5

300 g of 1901, 1.5 g of TMPAE and 300 g of butanone were added into a pressure reactor equipped with a mechanical stirrer, a condenser and a heating device. The obtained mixture solution was heated to 75° C., then 0.2 g of DBTDA and 27.6 g of HDI were added therein during stirring; the reaction temperature was kept at 75±2° C. until no free NCO group was observed by IR; and thus clear and transparent polyurethane solution was obtained. Finally, butanone was added therein to adjust the solid content of the obtained polyurethane solution to 40%. It was recorded as PU-5.

Synthesis Example 6

300 g of T5652, 2.3 g of TMPAE and 300 g of butanone were added into a pressure reactor equipped with a mechanical stirrer, a condenser, and a heating device. The obtained mixture solution was heated to 75° C., then 0.2 g of DBTDA and 28.2 g of HDI were added therein during stirring; the reaction temperature was kept at 75±2° C. until no free NCO group was observed by IR; and thus clear and transparent polyurethane solution was obtained. Finally, butanone was added therein to adjust the solid content of the obtained polyurethane solution to 40%. Finally, butanone was added therein to adjust the solid content of the obtained polyurethane solution to 40%. It was recorded as PU-6.

Synthesis Example 7

300 g of PPG2000, 2.3 g of TMPAE and 30.0 g of butanone were added into a pressure reactor equipped with a mechanical stirrer, a condenser, and a heating device. The obtained mixture solution was heated to 75° C., then 0.2 g of DBTDA and 28.1 g of HDI were added therein during stirring; the reaction temperature was kept at 75±2° C. until no free NCO group was observed by IR; and thus clear and transparent polyurethane solution was obtained. Finally, butanone was added therein to adjust the solid content of the obtained polyurethane solution to 40%. It was recorded as PU-7.

Synthesis of (methyl) Acrylic Polymer

Synthesis Example 8

52 parts by weight of MA, 43 parts by weight of BA, 5 parts by weight of GMA, 0.2 parts by weight of VAZO 67, and 150 parts by weight of EA were mixed in a glass bottle. Nitrogen was charged therein for two minutes to remove oxygen and then the glass bottle was sealed. The reaction bottle was placed in polymerization equipment to perform polymerization reaction at 60° C. for 24 hours to prepare a solvent-based (methyl)acrylic polymer with solid content of 40%. It was recorded as PA-8.

TABLE 1

DSC Test Results Of Low-Crystallinity Polyurethane Polymers And Contrast Samples

| | PU-1 | PU-2 | PU-3 | PU-4 | PU-5 | PU-6 | PU-7 | HF-3H95SL |
|---|---|---|---|---|---|---|---|---|
| Crystallization peak (Temperature drop curve) | None | None | None | None | None | None | None | Exists |
| Melting peak (second-round temperature rise curve) | None | None | None | None | None | None | None | Exists. Crystal melting enthalpy: 57.3 J/g |
| XRD crystallinity | Crystal diffraction peak not observed | Crystal diffraction peak not observed | Crystal diffraction peak not observed | Crystal diffraction peak not observed | Crystal diffraction peak not observed | Crystal diffraction peak not observed | Crystal diffraction peak not observed | 31.3% |

Preparation of Polyurethane-Based UV-Curable Composition

Embodiment 1 (E1)

In a 500 ml round-bottom flask, 250 g of the polyurethane polymer solution (i.e., 100 g of polyurethane polymer)

obtained in synthesis example 1, 17.6 g of PETMP (containing 0.144 mol of sulfhydryl group), 25.2 g of EPON 828 (containing 0.135 mol of epoxy group), 2.8 g of PBD02, and 1.4 g of EAQ were mixed uniformly.

Part of the obtained mixture was applied onto a PET release film and drying was performed at a temperature of 100° C. for 10 min. The thickness of the dry film was 75 μm. After that, another layer of PET release film was used to cover the surface of the dry adhesive film for subsequent determination of overlap shear strength (OLS), push-out force, and drop-resistance performance according to the above-mentioned measurement methods.

The other part of the obtained mixture was applied onto a PET film with a thickness of 50 microns and drying was performed in an oven at a temperature of 100° C. for 10 min. The thickness of the dry film was 75 μm. After that, a layer of PET release film was used to cover the surface of the dried adhesive film for subsequent determination of initial peeling force and peeling force after curing according to the above-mentioned measurement methods.

Embodiment 2 (E2)

In a 500 ml round-bottom flask, 250 g of the polyurethane polymer solution (i.e., 100 g of polyurethane polymer) obtained in synthesis example 1, 18.2 g of KARENZ MT PEI (containing 0.134 mol of sulfhydryl group), 24.6 g of EPON 828 (containing 0.132 mol of epoxy group), 2.8 g of PBD02, and 1.4 g of EAQ were mixed uniformly.

The preparation and treatment of the adhesive film, and the tests of the overlap shear strength (OLS), push-out force, drop-resistance performance, initial peeling force and peeling force after curing of the adhesive film were the same as that in Embodiment 1.

Embodiment 3 (E3)

In a 500 ml round-bottom flask, 250 g of the polyurethane polymer solution (i.e., 100 g of polyurethane polymer) obtained in synthesis example 2, 18.2 g of KARENZ MT PEI (containing 0.134 mol of sulfhydryl group), 24.6 g of EPON 828 (containing 0.132 mol of epoxy group), 2.8 g of PBD02, and 1.4 g of EAQ were mixed uniformly.

The preparation and treatment of the adhesive film, and the tests of the overlap shear strength (OLS), push-out force, drop-resistance performance, initial peeling force and peeling force after curing of the adhesive film were the same as that in Embodiment 1.

Embodiment 4 (E4)

In a 500 ml round-bottom flask, 250 g of the polyurethane polymer solution (i.e., 100 g of polyurethane polymer) obtained in synthesis example 3, 18.2 g of KARENZ MT PEI (containing 0.134 mol of sulfhydryl group), 24.6 g of EPON 828 (containing 0.132 mol of epoxy group), 2.8 g of PBD02, and 1.4 g of EAQ were mixed uniformly.

The preparation and treatment of the adhesive film, and the tests of the overlap shear strength (OLS), push-out force, drop-resistance performance, initial peeling force and peeling force after curing of the adhesive film were the same as that in Embodiment 1.

Embodiment 5 (E5)

In a 500 ml round-bottom flask, 250 g of the polyurethane polymer solution (i.e., 100 g of polyurethane polymer) obtained in synthesis example 4, 18.2 g of KARENZ MT PEI (containing 0.134 mol of sulfhydryl group), 24.6 g of EPON 828 (containing 0.132 mol of epoxy group), 2.8 g of PBD02, and 1.4 g of EAQ were mixed uniformly.

The preparation and treatment of the adhesive film, and the tests of the overlap shear strength (OLS), push-out force, drop-resistance performance, initial peeling force and peeling force after curing of the adhesive film were the same as that in Embodiment 1.

Embodiment 6 (E6)

In a 500 ml round-bottom flask, 250 g of the polyurethane polymer solution (i.e., 100 g of polyurethane polymer) obtained in synthesis example 5, 18.2 g of KARENZ MT PEI (containing 0.134 mol of sulfhydryl group), 24.6 g of EPON 828 (containing 0.132 mol of epoxy group), 2.8 g of PBD02, and 1.4 g of EAQ were mixed uniformly.

The preparation and treatment of the adhesive film, and the tests of the overlap shear strength (OLS), push-out force, drop-resistance performance, initial peeling force and peeling force after curing of the adhesive film were the same as that in Embodiment 1.

Embodiment 7 (E7)

In a 500 ml round-bottom flask, 250 g of the polyurethane polymer solution (i.e., 100 g of polyurethane polymer) obtained in synthesis example 6, 18.2 g of KARENZ MT PEI (containing 0.134 mol of sulfhydryl group), 24.6 g of EPON 828 (containing 0.132 mol of epoxy group), 2.8 g of PBD02, and 1.4 g of EAQ were mixed uniformly.

The preparation and treatment of the adhesive film, and the tests of the overlap shear strength (OLS), push-out force, drop-resistance performance, initial peeling force and peeling force after curing of the adhesive film were the same as that in Embodiment 1.

Embodiment 8 (E8)

In a 500 ml round-bottom flask, 250 g of the polyurethane polymer solution (i.e., 100 g of polyurethane polymer) obtained in synthesis example 7, 18.2 g of KARENZ MT PEI (containing 0.134 mol of sulfhydryl group), 24.6 g of EPON 828 (containing 0.132 mol of epoxy group), 2.8 g of PBD02, and 1.4 g of EAQ were mixed uniformly.

The preparation and treatment of the adhesive film, and the tests of the overlap shear strength (OLS), push-out force, drop-resistance performance, initial peeling force and peeling force after curing of the adhesive film were the same as that in Embodiment 1.

Embodiment 9 (E9)

In a 500 ml round-bottom flask, 250 g of the polyurethane polymer solution (i.e., 100 g of polyurethane polymer) obtained in synthesis example 1, 2.2 g of KARENZ MT PEI (containing 0.016 mol of sulfhydryl group), 3.0 g of EPON 828 (containing 0.016 mol of epoxy group), 2.2 g of PBD02, and 1.2 g of EAQ were mixed uniformly.

The preparation and treatment of the adhesive film, and the tests of the overlap shear strength (OLS), push-out force, drop-resistance performance, initial peeling force and peeling force after curing of the adhesive film were the same as that in Embodiment 1.

Embodiment 10 (E10)

In a 500 ml round-bottom flask, 250 g of the polyurethane polymer solution (i.e., 100 g of polyurethane polymer)

obtained in synthesis example 1, 4.8 g of KARENZ MT PEI (containing 0.035 mol of sulfhydryl group), 6.4 g of EPON 828 (containing 0.034 mol of epoxy group), 2.2 g of PBD02, and 1.2 g of EAQ were mixed uniformly.

The preparation and treatment of the adhesive film, and the tests of the overlap shear strength (OLS), push-out force, drop-resistance performance, initial peeling force and peeling force after curing of the adhesive film were the same as that in Embodiment 1.

Embodiment 11 (E11)

In a 500 ml round-bottom flask, 250 g of the polyurethane polymer solution (i.e., 100 g of polyurethane polymer) obtained in synthesis example 1, 10.6 g of KARENZ MT PEI (containing 0.078 mol of sulfhydryl group), 14.4 g of EPON 828 (containing 0.077 mol of epoxy group), 2.6 g of PBD02, and 1.2 g of EAQ were mixed uniformly.

The preparation and treatment of the adhesive film, and the tests of the overlap shear strength (OLS), push-out force, drop-resistance performance, initial peeling force and peeling force after curing of the adhesive film were the same as that in Embodiment 1.

Embodiment 12 (E12)

In a 500 ml round-bottom flask, 250 g of the polyurethane polymer solution (i.e., 100 g of polyurethane polymer) obtained in synthesis example 1, 28.2 g of KARENZ MT PEI (containing 0.207 mol of sulfhydryl group), 38.4 g of EPON 828 (containing 0.205 mol of epoxy group), 3.2 g of PBD02, and 1.6 g of EAQ were mixed uniformly.

The preparation and treatment of the adhesive film, and the tests of the overlap shear strength (OLS), push-out force, drop-resistance performance, initial peeling force and peeling force after curing of the adhesive film were the same as that in Embodiment 1.

Embodiment 13 (E13)

In a 500 ml round-bottom flask, 250 g of the polyurethane polymer solution (i.e., 100 g of polyurethane polymer) obtained in synthesis example 1, 28.2 g of KARENZ MT PEI (containing 0.207 mol of sulfhydryl group), 35.6 g of EPON 828 (containing 0.19 mol of epoxy group), 9 g of NPES901 (containing 0.015 mol of epoxy group), 3.4 g of PBD02, and 1.6 g of EAQ were mixed uniformly.

The preparation and treatment of the adhesive film, and the tests of the overlap shear strength (OLS), push-out force, drop-resistance performance, initial peeling force and peeling force after curing of the adhesive film were the same as that in Embodiment 1.

Embodiment 14 (E14)

In a 500 ml round-bottom flask, 250 g of the polyurethane polymer solution (i.e., 100 g of polyurethane polymer) obtained in synthesis example 1, 18.2 g of KARENZ MT PEI (containing 0.134 mol of sulfhydryl group), 24.6 g of EPON 828 (containing 0.132 mol of epoxy group), 0.5 g of PBD02, and 0.25 g of EAQ were mixed uniformly.

The preparation and treatment of the adhesive film, and the tests of the overlap shear strength (OLS), push-out force, drop-resistance performance, initial peeling force and peeling force after curing of the adhesive film were the same as that in Embodiment 1.

Embodiment 15 (E15)

In a 500 ml round-bottom flask, 250 g of the polyurethane polymer solution (i.e., 100 g of polyurethane polymer) obtained in synthesis example 1, 18.2 g of KARENZ MT PEI (containing 0.134 mol of sulfhydryl group), 24.6 g of EPON 828 (containing 0.132 mol of epoxy group), 7.1 g of PBD02, and 3.6 g of EAQ were mixed uniformly.

The preparation and treatment of the adhesive film, and the tests of the overlap shear strength (OLS), push-out force, drop-resistance performance, initial peeling force and peeling force after curing of the adhesive film were the same as that in Embodiment 1.

Embodiment 16 (E16)

In a 500 ml round-bottom flask, 250 g of the polyurethane polymer solution (i.e., 100 g of polyurethane polymer) obtained in synthesis example 1, 18.2 g of KARENZ MT PEI (containing 0.134 mol of sulfhydryl group), 24.6 g of EPON 828 (containing 0.132 mol of epoxy group), 11.5 g of PBD02, and 7.2 g of EAQ were mixed uniformly.

The preparation and treatment of the adhesive film, and the tests of the overlap shear strength (OLS), push-out force, drop-resistance performance, initial peeling force and peeling force after curing of the adhesive film were the same as that in Embodiment 1.

Embodiment 17 (E17)

In a 500 ml round-bottom flask, 250 g of the polyurethane polymer solution (i.e., 100 g of polyurethane polymer) obtained in synthesis example 1, 17.6 g of PETMP (containing 0.144 mol of sulfhydryl group), 25.2 g of EPON 828 (containing 0.135 mol of epoxy group), and 11.2 g of PBD02 were mixed uniformly.

The preparation and treatment of the adhesive film, and the tests of the overlap shear strength (OLS), push-out force, drop-resistance performance, initial peeling force and peeling force after curing of the adhesive film were the same as that in Embodiment 1.

Comparative Example 1 (C1)

In a 500 ml round-bottom flask, 250 g of the polyurethane polymer solution (i.e., 100 g of polyurethane polymer) obtained in synthesis example 4 and 3.0 g of RD1054 were mixed uniformly.

The preparation and treatment of the adhesive film, and the tests of the overlap shear strength (OLS), push-out force, drop-resistance performance, initial peeling force and peeling force after curing of the adhesive film were the same as that in Embodiment 1.

Comparative Example 2 (C2)

In a 500 ml round-bottom flask, 100 g of HF-3H95SL was dissolved in 75 g of butanone, and then 18.2 g of KARENZ MT PEI (containing 0.134 mol of sulfhydryl group), 24.6 g of EPON 828 (containing 0.132 mol of epoxy group), 2.8 g of PBD02, and 1.4 g of EAQ were added and mixed uniformly.

The preparation and treatment of the adhesive film, and the tests of the overlap shear strength (OLS), push-out force, drop-resistance performance, initial peeling force and peeling force after curing of the adhesive film were the same as that in Embodiment 1.

Comparative Example 3 (C3)

In a 500 ml round-bottom flask, 250 g of the polyurethane polymer solution (i.e., 100 g of polyurethane polymer) obtained in synthesis example 1, 42.8 g of KARENZ MT PEI (containing 0.315 mol of sulfhydryl group), 61.4 g of EPON 828 (containing 0.328 mol of epoxy group), 4 g of PBD02, and 2 g of EAQ were mixed uniformly.

The preparation and treatment of the adhesive film, and the tests of the overlap shear strength (OLS), push-out force, drop-resistance performance, initial peeling force and peeling force after curing of the adhesive film were the same as that in Embodiment 1.

Comparative Example 4 (C4)

In a 500 ml round-bottom flask, 250 g of the polyurethane polymer solution (i.e., 100 g of polyurethane polymer) obtained in synthesis example 8, 10.6 g of KARENZ MT PEI (containing 0.078 mol of sulfhydryl group), 14.4 g of EPON 828 (containing 0.077 mol of epoxy group), 2.6 g of PBD02, and 1.2 g of EAQ were mixed uniformly.

The preparation and treatment of the adhesive film, and the tests of the overlap shear strength (OLS), push-out force, drop-resistance performance, initial peeling force and peeling force after curing of the adhesive film were the same as that in Embodiment 1.

Comparative Example 5 (C5)

In a 500 ml round-bottom flask, 250 g of the polyurethane polymer solution obtained in synthesis example 1, 42.8 g of EPON 828 (containing 0.228 mol of epoxy group), and 2.8 g of 1176 were mixed uniformly.

The preparation and treatment of the adhesive film, and the tests of the overlap shear strength (OLS), push-out force, drop-resistance performance, initial peeling force and peeling force after curing of the adhesive film were the same as that in Embodiment 1.

Comparative Example 6 (C6)

In a 500 ml round-bottom flask, 250 g of the polyurethane polymer solution (i.e., 100 g of polyurethane polymer) obtained in synthesis example 1, 18.2 g of KARENZ MT PEI (containing 0.134 mol of sulfhydryl group), 24.6 g of EPON 828 (containing 0.132 mol of epoxy group), 0.14 g of PBD02, and 0.07 g of EAQ were mixed uniformly.

The preparation and treatment of the adhesive film, and the tests of the overlap shear strength (OLS), push-out force, drop-resistance performance, initial peeling force and peeling force after curing of the adhesive film were the same as that in Embodiment 1.

Comparative Example 7 (C7)

In a 500 ml round-bottom flask, 250 g of the polyurethane polymer solution (i.e., 100 g of polyurethane polymer) obtained in synthesis example 1, 18.2 g of KARENZ MT PEI (containing 0.134 mol of sulfhydryl group), 24.6 g of EPON 828 (containing 0.132 mol of epoxy group), 17.2 g of PBD02, and 8.6 g of EAQ were mixed uniformly.

The preparation and treatment of the adhesive film, and the tests of the overlap shear strength (OLS), push-out force, drop-resistance performance, initial peeling force and peeling force after curing of the adhesive film were the same as that in Embodiment 1.

TABLE 2

Components of Compostions in Embodiments E1-E17 and Comparative Examples C1-C7

| Embodiment/ comparative example | Polyurethane polymer (Weight: 100 g) | Weight of thiol (g) | Epoxy resin Weight (g) | Moles of sulfhydryl group/100 g of polymer | Moles of epoxy group/100 g of polymer | Weight (g) of photobase generator/100 g of polymer | Weight (g) of photosensitizer/ 100 g of polymer |
|---|---|---|---|---|---|---|---|
| E1 | PU-1 | 17.6 | 25.2 | 0.144 | 0.135 | 2.8 | 1.4 |
| E2 | PU-1 | 18.2 | 24.6 | 0.134 | 0.132 | 2.8 | 1.4 |
| E3 | PU-2 | 18.2 | 24.6 | 0.134 | 0.132 | 2.8 | 1.4 |
| E4 | PU-3 | 18.2 | 24.6 | 0.134 | 0.132 | 2.8 | 1.4 |
| E5 | PU-4 | 18.2 | 24.6 | 0.134 | 0.132 | 2.8 | 1.4 |
| E6 | PU-5 | 18.2 | 24.6 | 0.134 | 0.132 | 2.8 | 1.4 |
| E7 | PU-6 | 18.2 | 24.6 | 0.134 | 0.132 | 2.8 | 1.4 |
| E8 | PU-7 | 18.2 | 24.6 | 0.134 | 0.132 | 2.8 | 1.4 |
| E9 | PU-1 | 2.2 | 3.0 | 0.016 | 0.016 | 2.2 | 1.2 |
| E10 | PU-1 | 4.8 | 6.4 | 0.035 | 0.034 | 2.2 | 1.2 |
| E11 | PU-1 | 10.6 | 14.4 | 0.078 | 0.077 | 2.6 | 1.3 |
| E12 | PU-1 | 28.2 | 38.4 | 0.207 | 0.205 | 3.2 | 1.6 |
| E13 | PU-1 | 28.2 | 44.6 | 0.207 | 0.205 | 3.4 | 1.7 |
| E14 | PU-1 | 18.2 | 24.6 | 0.134 | 0.132 | 0.5 | 0.25 |
| E15 | PU-1 | 18.2 | 24.6 | 0.134 | 0.132 | 7.1 | 3.6 |
| E16 | PU-1 | 18.2 | 24.6 | 0.134 | 0.132 | 11.5 | 7.2 |
| E17 | PU-1 | 17.6 | 25.2 | 0.144 | 0.135 | 5.6 | 0 |
| C1 | PU-4 | 0 | 0 | 0 | 0 | 0 | 0 |
| C2 | HF-3H95SL | 18.2 | 24.6 | 0.134 | 0.132 | 2.8 | 1.4 |
| C3 | PU-1 | 42.8 | 61.4 | 0.315 | 0.328 | 4.0 | 2.0 |
| C4 | PA-8 | 10.6 | 14.4 | 0.078 | 0.077 | 2.6 | 1.3 |
| C5 | PU-1 | 0 | 42.8 | 0 | 0.228 | 0 | 0 |
| C6 | PU-1 | 18.2 | 24.6 | 0.134 | 0.132 | 0.14 | 0.07 |
| C7 | PU-1 | 18.2 | 24.6 | 0.134 | 0.132 | 17.2 | 8.6 |

| | Initial peeling force (N/mm) | Peeling force after curing (N/mm) | Overlap shear strength (MPa) | Push-out force (N) | Drop-resistance performance |
|---|---|---|---|---|---|
| E1 | 1.32 | 1.19 | 8.2 | 1750 | 1.9 m, >30 times |
| E2 | 1.29 | 1.14 | 7.9 | 1630 | 1.9 m, >30 times |
| E3 | 1.35 | 0.95 | 7.1 | 1540 | 1.9 m, >30 times |
| E4 | 1.40 | 1.1 | 10.3 | 1770 | 1.9 m, >30 times |
| E5 | 1.38 | 1.14 | 10.6 | 1831 | 1.9 m, >30 times |
| E6 | 0.72 | 0.48 | 4.6 | 850 | 1.9 m, >30 times |
| E7 | 0.85 | 0.63 | 7.4 | 1180 | 1.9 m, >30 times |
| E8 | 0.40 | 0.43 | 3.6 | 770 | 1.9 m, >30 times |
| E9 | 1.75 | 1.64 | 1.51 | 519 | 1.9 m, >30 times |
| E10 | 1.67 | 1.4 | 1.8 | 831 | 1.9 m, >30 times |
| E11 | 1.80 | 1.1 | 7.2 | 990 | 1.9 m, >30 times |
| E12 | 0.69 | 0.92 | 10.9 | 1920 | 1.9 m, >30 times |
| E13 | 0.72 | 1.05 | 10.2 | 1776 | 1.9 m, >30 times |
| E14 | 1.32 | 1.2 | 4.2 | NM | 1.9 m, >30 times |
| E15 | 1.20 | 0.97 | 9.2 | NM | 1.9 m, >30 times |
| E16 | 1.05 | 0.87 | 9.8 | NM | 1.9 m, >30 times |
| E17 | 1.28 | 1.05 | 6.1 | NM | 1.9 m, >30 times |
| C1 | 1.17 | 1.17 | 0.3 | 480 | 0.7 m, 6 times |
| C2 | <0.01 | — | — | — | — |
| C3 | 0.58 | 0.75 | 9.6 | 1580 | 0.7 m, 1 time |
| C4 | 0.59 | 0.84 | 5.1 | 658 | 0.7 m, 1 time |
| C5 | 0.62 | 0.62 | 0.05 | 42 | NM |
| C6 | 1.36 | 0.85 | 0.07 | 50 | NM |
| C7 | — | — | — | — | — |

In the table, "NM" means that no test is performed according to the experimental situation; "-" means that the corresponding test results cannot be obtained.

From the test results of Embodiments E1-E17 in Table 3, it can be seen that, by using the low-crystallinity polyurethane polymer, the multifunctional thiol compound, the multifunctional epoxy resin compound, and the photobase generator, as well as the optional photosensitizer, the obtained adhesive tapes or adhesive films can provide desirable initial bonding strength or initial adhesiveness before UV curing (both initial adhesiveness and initial peeling force greater than or equal to 0.4 N/mm), especially when these components are used according to specific relative content. After UV curing, the adhesive tapes and adhesive films can achieve desired strength for the semi-structural adhesive or higher strength (overlap shear strength greater than or equal to 1.5 MPa), and have excellent drop-resistance performance (i.e., sustaining drops from a height of 190 cm for greater than 30 times).

In Embodiments E1-E8, different low-crystallinity polyurethane compositions are used, and the obtained adhesive tapes or adhesive films can provide good initial bonding strength or initial adhesiveness before UV curing; after UV curing, the adhesive tapes and adhesive films can reach the strength of the semi-structured adhesive or higher strength, and have excellent drop-resistance performance (i.e., surviving drops from a height of 190 cm for greater than 30 times). The low-crystallinity polyurethane compositions PU-1 to PU-4 respectively used in Embodiments E1-E5 comprise a reaction product of polyol PH56 and isocyanate. The prepared adhesive tapes or adhesive films have higher initial peeling force (initial peeling force greater than or equal to 1.2 N/mm); higher peeling force after curing (peeling force after curing greater than or equal to 0.9 N/mm); and higher overlap shear strength (overlap shear strength greater than or equal to 7.0 Mpa). The low-crystallinity polyurethane compositions respectively used in Embodiments E6-E8 do not comprise a reaction product of polyol PH56 and isocyanate. The prepared adhesive tapes or adhesive films have slightly smaller initial peeling force (initial peeling force greater than or equal to 0.4 N/mm), slightly smaller peeling force after curing (peeling force after curing greater than or equal to 0.4 N/mm), and slightly lower overlap shear strength (overlap shear strength greater than or equal to 3.5 MPa).

The content of the sulfhydryl groups of the multifunctional thiol compounds respectively used in the adhesive tapes and adhesive films in Embodiments E9-E13 is different, and the content of the epoxy group of the multifunctional epoxy resin compounds is also different. Based on every 100 g of the low-crystallinity polyurethane polymer, when the sulfhydryl group and epoxy group contained in the multifunctional thiol compounds are greater than or equal to 0.075 mol, the prepared adhesive tapes or adhesive films have higher initial peeling force (initial peeling force greater than or equal to 0.6 N/mm), higher peeling force after curing (peeling force after curing greater than or equal to 0.9 N/mm), and higher overlap shear strength (overlap shear strength greater than or equal to 7.0 Mpa), and have excellent drop-resistance performance (i.e., surviving drops from a height of 190 cm for greater than 30 times).

In Embodiments E14-E16, the content of the photobase generators used in the adhesive tapes and adhesive films is different. The prepared adhesive tapes have excellent drop-resistance performance, peeling strength and overlap shear strength. In Embodiment E17, no photosensitizer is added, and the prepared adhesive tape/adhesive film also has excellent drop-resistance performance, peeling strength and overlap shear strength that satisfy the requirements in the present invention.

On the contrary, the formulas of comparative examples C1-C7 do not fall within the range in the present invention. From the test results, it can be seen that the corresponding adhesive films do not have desirable bonding strength (initial bonding force and overlap shear strength after curing) and do not have excellent drop-resistance performance. The composition in comparative example C1 only consists of the low-crystallinity polyurethane polymer. Although the corresponding adhesive film has initial adhesiveness, overlap shear strength and drop-resistance performance thereof are poor. The composition in comparative example C2 comprises a high-crystallinity polyurethane polymer (instead of a low-crystallinity polyurethane polymer used in the present invention), the prepared adhesive film is opaque, has no initial adhesiveness, and does not have the performance of pressure-sensitive adhesive, such that the other related performances cannot be measured.

The content of thiol and epoxy compounds contained in the polyurethane-based UV-curable composition in comparative example C3 is not in the range in the present invention. From the test results of the adhesive film, it can be seen that, when the content of the multifunctional thiol compound and the multifunctional epoxy compound in the polyurethane-based UV-curable composition is too high relative to the low-crystallinity polyurethane polymer, the drop-resistance performance of the corresponding adhesive film becomes quite poor.

The content of thiol and epoxy compounds contained in the polyurethane-based UV-curable composition in comparative example C4 does not fall within the range in the present invention either. From the test results of the adhesive film, it can be seen that, when the content of the multifunctional thiol compound and the multifunctional epoxy compound in the polyurethane-based UV-curable composition is too low relative to the low-crystallinity polyurethane polymer, the drop-resistance performance of the corresponding adhesive film also becomes poor.

From the test results of comparative example C5, it can be seen that, when the multifunctional thiol compound and photobase generator are not cooperatively used in the polyurethane-based UV-curable composition, and only the epoxy compound, photoacid generator, and low-crystallinity polyurethane are used, the peeling force after curing, overlap shear strength and push-out force of the prepared adhesive film are very poor. Moreover, since the adhesive film is not cured after irradiated by UV and is placed at room temperature for a long duration, the drop-resistance performance cannot be tested.

The content of the photobase generator in the polyurethane-based UV-curable composition in comparative examples C6 and C7 does not fall within the range in the present invention. From the test results of comparative example C6, it can be seen that, when the content of the photobase generator in the polyurethane-based UV-curable composition is too low, the overlap shear strength and push-out force of the prepared adhesive film are poor. When the content of the photobase generator in the polyurethane-based UV-curable composition in comparative example C7 is too high, solids will precipitate from the prepared adhesive film; the initial adhesiveness of the adhesive film decreases; and the peeling force after curing, OLS, push-out force and drop-resistance performance cannot be tested.

Though the above specific embodiments comprise many concrete details for the purpose of exemplary description, it should be understood by one skilled in the art that many variations, modifications, replacements, and changes to these details shall all fall within the scope of the present invention as claimed in the claims. Therefore, the disclosure as described in the specific embodiments does not pose any limitation to the present invention as claimed in the claims. The proper scope of the present invention should be defined by the claims and proper legal equivalents thereof. All references referred to are incorporated herein by reference in their entireties.

The invention claimed is:

1. A polyurethane-based UV-curable composition, the polyurethane-based UV-curable composition comprising:
 (a) a low-crystallinity polyurethane polymer, a crystal melting enthalpy of the low-crystallinity polyurethane polymer tested by adopting a DSC testing method being smaller than 1 J/g, the low-crystallinity polyurethane polymer comprising a reaction product of an isocyanate component and a polyol component;
 (b) a multifunctional thiol compound, based on every 100 g of the low-crystallinity polyurethane polymer, the multifunctional thiol compound containing 0.01-0.25 mol of a sulfhydryl group;
 (c) a multifunctional epoxy resin compound, based on every 100 g of the low-crystallinity polyurethane polymer, the multifunctional epoxy resin compound containing 0.01-0.25 mol of an epoxy group; and
 (d) a photobase generator, based on every 100 g of the low-crystallinity polyurethane polymer, the amount of the photobase generator being 0.3-15.0 g.

2. The polyurethane-based UV-curable composition according to claim 1, wherein based on every 100 g of the low-crystallinity polyurethane polymer, the polyurethane-based UV-curable composition comprises:
 the multifunctional thiol compound containing 0.016-0.205 mol of a sulfhydryl group;
 the multifunctional epoxy resin compound containing 0.016-0.205 mol of an epoxy group; and
 0.5-11.5 g of the photobase generator.

3. The polyurethane-based UV-curable composition according to claim 2, wherein based on every 100 g of the low-crystallinity polyurethane polymer, the polyurethane-based UV-curable composition comprises:
 the multifunctional thiol compound containing 0.07-0.205 mol of a sulfhydryl group; and
 the multifunctional epoxy resin compound containing 0.07-0.205 mol of an epoxy group.

4. The polyurethane-based UV-curable composition according to claim 1, wherein the molar ratio of the sulfhydryl group in the multifunctional thiol compound to the epoxy group in the multifunctional epoxy resin compound is in a range from 1.2:1 to 1:1.2.

5. The polyurethane-based UV-curable composition according to claim 4, wherein the molar ratio of the sulfhydryl group in the multifunctional thiol compound to the epoxy group in the multifunctional epoxy resin compound is 1:1.

6. The polyurethane-based UV-curable composition according to claim 1, wherein the multifunctional thiol compound is a thiol compound with equal to or greater than 3 sulfhydryl groups in each molecule.

7. The polyurethane-based UV-curable composition according to claim 1, wherein the number-average molecular weight of the polyol component is equal to or greater than 1000 g/mol, preferably equal to or greater than 2000 g/mol.

8. The polyurethane-based UV-curable composition according to claim 7, wherein the polyol component comprises phthalate or isophthalate, and a repeating unit of an alkylidene group comprising at least 4 carbon atoms.

9. The polyurethane-based UV-curable composition according to claim 8, wherein the polyol component comprises a polymeric polyester polyol with the following structure:

where
- $R_1$ is independently an alkylidene group comprising at least 4 carbon atoms,
- n is greater than or equal to 2, and
- the ester group substituent group is bonded to the ring at the ortho-position or meta-position.

10. The polyurethane-based UV-curable composition according to claim 7, wherein the polyol component further comprises a polyol containing a cross-linkable functional group, and the cross-linkable functional group is selected from the group consisting of carboxyl, double bond, epoxy group and a combination thereof.

11. The polyurethane-based UV-curable composition according to claim 1, wherein the polyurethane-based UV-curable composition further comprises a photosensitizer.

12. The polyurethane-based UV-curable composition according to claim 11, wherein based on every 100 g of the low-crystallinity polyurethane polymer, the polyurethane-based UV-curable composition comprises 0.1-8.0 g of the photosensitizer.

13. An adhesive film, comprising the polyurethane-based UV-curable composition according to claim 1.

14. The adhesive film according to claim 13, wherein the initial peeling force of the adhesive film before UV curing is greater than 0.4 N/mm, the overlap shear strength after UV curing is greater than 1.5 MPa, and the adhesive film has drop-resistance performance that the adhesive film is capable of surviving drops from a height of 190 cm for more than 30 times.

15. An adhesive tape, comprising the adhesive film according to claim 13.

16. The adhesive tape according to claim 15, wherein the adhesive tape further comprises a release film or release paper on one or two sides of the adhesive film.

\* \* \* \* \*